United States Patent
Schmidt (10) Patent No.: US 7,193,984 B2
(45) Date of Patent: Mar. 20, 2007

(54) METHOD FOR DETERMINING A TIME OFFSET OF A CDMA SIGNAL

(75) Inventor: Kurt Schmidt, Grafing (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 1084 days.

(21) Appl. No.: 10/253,059

(22) Filed: Sep. 25, 2002

(65) Prior Publication Data

US 2003/0067938 A1    Apr. 10, 2003

(30) Foreign Application Priority Data

Oct. 8, 2001    (DE) ................................ 101 49 544

(51) Int. Cl.
*H04B 7/216*    (2006.01)
*H04B 1/00*    (2006.01)
*H04J 3/06*    (2006.01)

(52) U.S. Cl. .................. 370/335; 370/342; 370/515; 375/148

(58) Field of Classification Search ................ 370/335, 370/342, 441; 375/147–148, 349
See application file for complete search history.

(56) References Cited

U.S. PATENT DOCUMENTS

| | | | |
|---|---|---|---|
| 6,396,827 B1 * | 5/2002 | Paivike et al. ............... | 370/347 |
| 6,717,978 B1 * | 4/2004 | Yang et al. .................. | 375/150 |
| 6,771,692 B2 * | 8/2004 | Rick et al. ................... | 375/148 |
| 6,788,669 B1 * | 9/2004 | Takano et al. ............... | 370/342 |
| 6,922,434 B2 * | 7/2005 | Wang et al. ................. | 375/148 |
| 2001/0046255 A1 * | 11/2001 | Shattil ........................ | 375/142 |
| 2002/0015390 A1 * | 2/2002 | Lundby et al. .............. | 370/311 |
| 2002/0154620 A1 * | 10/2002 | Azenkot et al. ............ | 370/347 |

FOREIGN PATENT DOCUMENTS

| | | |
|---|---|---|
| DE | 198 32 851 C1 | 3/2000 |
| DE | 199 12 856 A1 | 10/2000 |
| DE | 100 55 748 A1 | 6/2001 |
| EP | 0 991 235 A2 | 4/2000 |

* cited by examiner

*Primary Examiner*—Ricky Q. Ngo
*Assistant Examiner*—Brian L. DeGrano
(74) *Attorney, Agent, or Firm*—Dithavong Mori & Steiner, P.C.

(57) ABSTRACT

A method is described for determining a time offset of a CDMA signal incurred during transfer. For each of a plurality of time offset estimates, the received chip sequence is multiplied with a conjugate complex scrambling code that is shifted by a number of chips according to one of the time offset estimates; the chip sequence is despreaded based on a spreading code of at least one selected data channel to produce a symbol sequence, and an estimated amplification factor is determined by summation of an amount of the symbol sequence. The maximum of the amplification factors for the time offset estimates when a selected data channel is active, or the minimum of the amplification factors for the time offset estimates when the selected data channel is not active is then determined.

13 Claims, 5 Drawing Sheets

METHOD FOR DETERMINING A TIME OFFSET OF A CDMA SIGNAL

FIELD OF THE INVENTION

The present invention relates to a method for determining the time offset of a Code Division Multiple Access (CDMA) signal, in particular for third generation mobile radio devices.

BACKGROUND OF THE INVENTION

The channel structure of a mobile radio system for third generation of mobile phones is described for instance in the book by T. Ojanperä, R. Prasad: "Wide Band CDMA for Third Generation Mobil Communication", Artech House Publishers, 1998, ISBN 0-89006-735-X, in the chapter "6.3.3 Physical Channels" (pp. 169–173). It is described therein that several data channels, referred to as Dedicated Physical Data Channels (DPDCH), and one control or pilot channel, referred to as a Dedicated Physical Control Channel (DPCCH), are available. While the data channels DPDCH are available for transfer of user data, the pilot channel DPCCH is used to transfer a pilot signal. It is proposed in the chapter "5.5.3 Pilot Signals" that pilot signal symbols of the pilot channel DPCCH be used exclusively for synchronization.

However, a disadvantage in using the pilot signal DPCCH for synchronization, which was commonly employed up until now, is that the relative output component of the pilot channel DPCCH is reduced with an increasing activity of the data channel DPDCH, making it difficult to achieve a reliable detection of the correlation peak.

Therefore, there is a need for a reliable determination of the time offset of the CDMA signal.

SUMMARY OF THE INVENTION

The present invention stems from the realization that it is advantageous to use one or more channels (for example, a data channel DPDCH) in the transfer path other than the pilot channel DPCCH for the determination of the time offset. Accordingly, the reception signal is first descrambled, wherein the conjugated complex scrambling code is shifted by a certain number of chips. This number of shifted chips belongs to one of several time offset estimates to be tested. After that, the symbol sequence is again established through despreading by using the spreading code of the selected data channel and finally, an estimated amplification factor is determined by adding up the amounts of this despreaded symbol sequence. This procedure is repeated for all possible time offsets within a certain range, preferably within the scrambling range. If it is known that the selected data channel is active, that is to say that activity involving data signal is taking place therein, then the object is to determine the maximum of the amplification signal. On the other hand, if it is known that the selected channel is inactive, that is to say that activity involving data signal is not taking place therein, then the minimum amplification factor needs to be determined instead. The respective time offset estimate in which the maximum or the minimum of the amplification factor occurs is the correct estimate, so that the proper number of offset chips will correspond to the time offset of the CDMA signal to be determined.

The advantage of the method according to the invention is in particular due to the fact that activity in several data channels at the maximum or minimum peak of the amplification factor is more distinct that the maximum or minimum peak of the pilot channel. In addition to the smaller output allocation of the pilot channel when compared to the data channels, the advantage according to this invention is also achieved because the pilot channel of customary mobile radio systems uses a very large spreading factor (for example SF=256). For the data channels can be used for example a 3GPP uplink in such a way so that a very high spreading factor is used at the beginning for the first data channel and the spreading factor is then successively reduced when higher data rates are desirable for transfer. If the data rate is still not sufficient even when the smallest spreading factor is used (for example SF=4), then a second data channel will be also used for operations with the smallest spreading factor, etc. The result of this method is that either at least one data channel that does not have any activity yet is constantly available, wherein smaller outputs of high code categories will be also copied in the code category of the smallest spreading factor, or at least one data channel will be available in which the code category is occupied with the smallest spreading factor activity. Detection can thus be performed constantly with the smallest spreading factor, that is to say with the lowest code category, which means that the length of the observation and the time required for processing are significantly reduced.

When it is not known whether the selected data channel is active or not, then both the maximum as well as the minimum of the amplification factor will be determined. If a distinct maximum is apparent, then the data channel will be determined as active. If a distinct minimum is apparent, then the data channel will be determined as not active.

The received chip sequence is preferably evaluated in a time window which corresponds to an integral multiple of the length of the spreading code.

A further acceleration of the method according to the invention can be achieved wherein all possible permutation of the product of the conjugate complex of the scrambling code with the spreading code which can occur with despreading are deposited per each symbol in a permutation matrix.

Without this measure, a plurality of the same multiplications would have to be performed during an evaluation of the different time offset estimate. The expense can be reduced by means of the permutation matrix because a concrete permutation of the permutation matrix can be accessed for a concrete time offset estimate for each symbol. At the same time, there are many $4^{SF-1}$ permutations, where SF is the spreading factor. If a data channel is used for the evaluation, which is either not active or which is active with the smallest spreading factor SF=4, then this will result in a calculation expense which is still executable thanks to a relatively small number of the permutations. The table method is effective with a small spreading factor. It is also possible, for example when spreading factor is 8, to use the tables of spreading factor of 4 with a supplementary addition to be used as well (a mixed form consisting of the table method and calculation).

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for determining the time offset of a CDMA signal are described by way of an example using a 3GPP uplink; the present invention, however, is not so limited and capable of general applicability. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
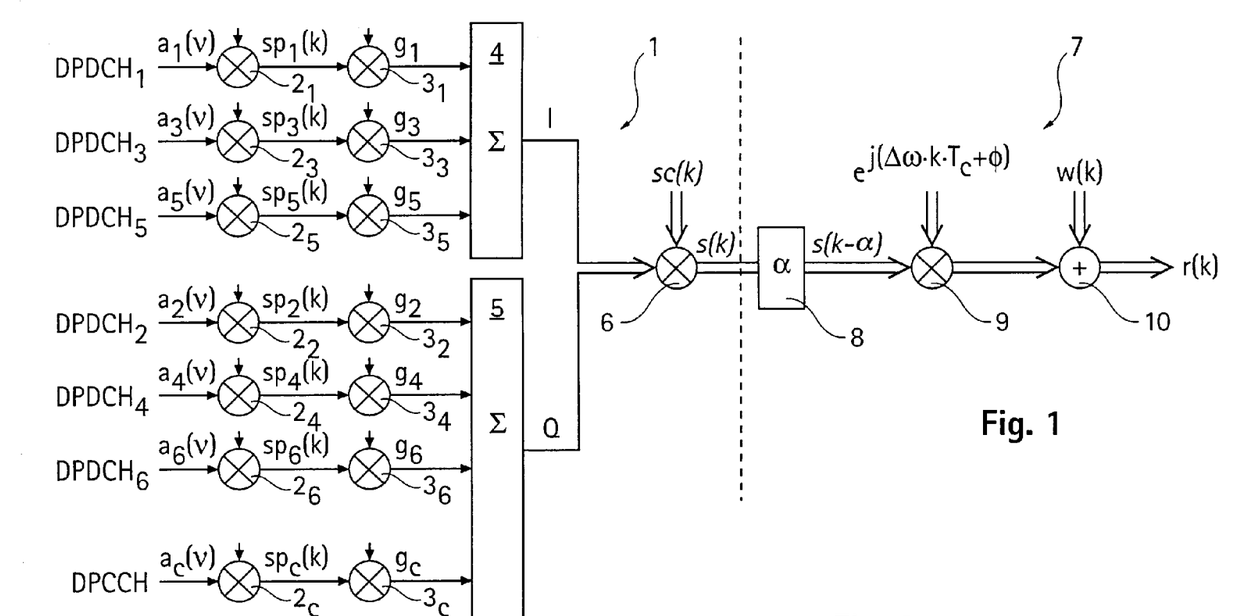
FIG. 1 shows a channel and transfer model based on the method according to the invention.

FIG. 1 shows a channel and a transfer model based on the method according to this invention. Several data signal symbols $a_1(v)$ through $a_6(v)$ are transmitted by a sender 1 by data channels $DPDCH_1$ through $DPDCH_6$ with different spreading codes $sp_1(k)$ through $sp_6(k)$. At the same time, pilot signal symbols $a_C(v)$ of a pilot channel DPCCH are transmitted with a spreading factor $sp_C(k)$. The symbol sequence indicated with the index v is at that point spread in a chip sequence indicated with the index k. To the pilot channel DPCCH or to each pilot channel DPCCH is assigned an amplification factor $g_C$ or $g_1$ through $g_6$. The amplification factor is zero when the corresponding channel is not active. The amplification factors of active channels can have different values. Usually, the amplification factor $g_C$ of the pilot channel DPCCH is smaller that the amplification factor $g_1$ through $g_6$ of the data channels DPDCH. The spreading with the spreading factors $sp_1$ through $sp_6$ or $sp_C$ is performed with multipliers $2_1$ through $2_6$ or $2_C$. The multiplication with the amplification factors $g_1$ through $g_6$ or $g_C$ is performed with multipliers $3_1$ through $3_6$ or $3_C$.

While the data channels $DPDCH_1$, $DPDCH_3$ and $DPDCH_5$ are integrated with the I (in-phase) components of the complex data signal in a summer 4, the digital data channels $DPDCH_2$, $DPDCH_4$ and $DPDCH_6$ as well as the pilot channel DPCCH are integrated in a summer 5 with the Q (quadrature) components of the complex data signal. In another multiplier 6 is then performed the multiplication with the scrambling code sc(k).

After that will occur transfer in the transfer channel 7, for instance a radio distance of a mobile radio system. The signal will undergo in the transfer channel 7 a time offset corresponding to a certain number α of chips. This can be modeled with a delay element 8. From the chip sequence s(k) will thus be obtained at the output of the sender 1 the chip sequence s(k-α). After that will occur a frequency shift Δω and a phase shift φ, which will apply a multiplier 9 to the signal in the model. In an adder 10 is then performed in the model also the addition of a white noise signal w(k), so that at the end of the transfer channel 7 will now be available the chip sequence r(k) to be received.

Figure 2:
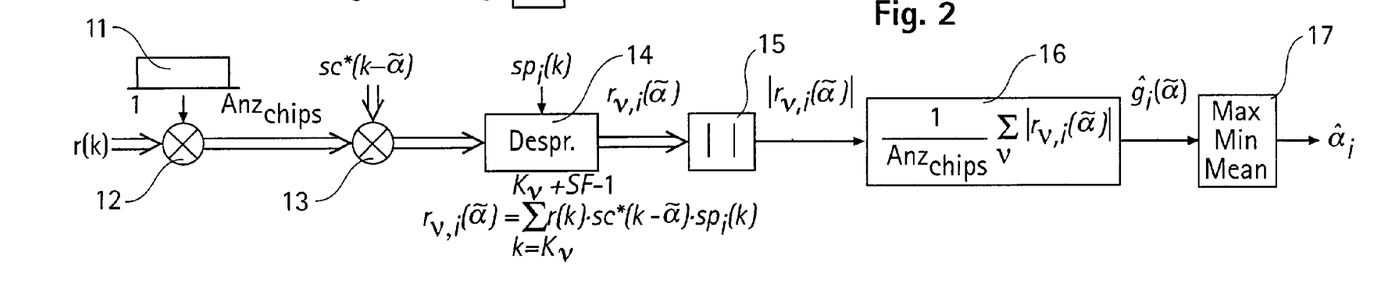
FIG. 2 is a block diagram of a first embodiment of the method according to the invention.

FIG. 2 shows a block diagram of the First Embodiment according to the method of this invention. The method serves in accordance with the invention to determine the time shift of CDMA signal, that is to say the number α of chips by which the CDMA signal s(k) is offset during the transfer in the transfer channel 7. The chip sequence r(k) is evaluated within a time window 11. Preferably, the length of the time window 11 corresponds to an integral multiple of the length of the spreading factor, that is to say in the time window 11 is contained a number $Anz_{chips}$ of chips that corresponds to a multiple of the length of the spreading code sp(k). The received chip sequence r(k) is multiplied in a multiplier 12 with a window function which is within the time window 1 and outside of the time windows 0. The received chip sequence is then multiplied in a multiplier 13 with the conjugate complex offset with scrambling factor sc*(k-α̃). Various corresponding time offset estimates are then formed, which are different with respect to the various estimates applied to the time offset, that is to say the number α̃ of chips by which the signal is offset during the transfer in accordance with the estimate. Because of that, the scrambling code must be offset in accordance with the time offset on which the estimate is based. The received chip series r(k) is calculated in a despreading block 14 according to the Formula:

$$r_{v,i}(\tilde{\alpha}) = \sum_{K=K_v}^{K_v+SF-1} r(k) \cdot sc*(k-\tilde{\alpha}) \cdot sp_i(k) \quad (1)$$

The symbols in the formula indicate the following:
k chip index
v symbol index
i index of the data channel DPDCH,
$k_v$ the beginning of the v-th symbol
r(k) the received chip sequence
sc*(k-α̃) the conjugate complex spreading code offset by α̃$_{chips}$
$sp_i(k)$ the spreading code of the i-th data channel $DPDCH_1$
SF the spreading factor, that is to say the length of the spreading code $sp_i(k)$
α̃ the number of the chips of the time offset on which the estimate is based.

The evaluation is then performed for a selected data channel $DPDCH_i$, specifically by utilizing the spreading code $sp_i(k)$. It is preferable when a data channel is used whose spreading code $sp_i(k)$ is relatively short.

The amounts of the despreading symbols $r_{v,i}(\tilde{\alpha})$ which has a complex value are then calculated in an amount component forming unit 15 and the mean value of the amounts of the despreading symbol sequence $r_{v,i}(\tilde{\alpha})$ is calculated in a mean value calculation device 16. The mean value of the amounts of the despreading sequence of symbols is the current estimated amplification factor $\hat{g}_i(\tilde{\alpha})$ for the i-th data channel $DPDCH_i$ based on the estimate that a time offset by $\tilde{\alpha}$ chips occurs in the transfer channel 7. The division by the number of the symbols $Anz_{sym}$ can be naturally also omitted in order to simplify implementation.

The above described method steps are repeated for all possible time offset estimates, that is to say for all possible values from $\tilde{\alpha}$, with $0 \leq \tilde{\alpha} < 38400$.

If it is known that selected data channel $DPDCH_i$ is an active data channel, then the maximum max of all amplification factors $\hat{g}_i(\tilde{\alpha})$ will be sought in the maximum/minimum evaluation unit 17. On the other hand, if it is known that that the channel $DPDCH_i$ which is used for evaluation is inactive, then the minimum min will be sought in the maximum/minimum evaluation unit 17 for all amplification factors $\hat{g}_i(\tilde{\alpha})$. In addition, the mean value mean or the median value median can be also calculated. If it is not known whether the data channel is active, the both the maximum and the minimum of the amplification factors will be sought. If the evaluated data channel $DPDCH_i$ is active, then the time offset estimate a in which a maximum of the amplification factor $\hat{g}_i(\tilde{\alpha})$ occurs will be decided upon. The $\tilde{\alpha}$ belonging to this maximum or minimum represents the time offset of the received CDMA signal r(k) to be determined for the sent CDMA signal s(k) in the unit of chip periods.

It is generally also possible to use multiple data channels which should be preferably all active or passive.

The maximum or minimum is then determined from a linear combination of the amplification factor $\hat{g}_i(\tilde{\alpha})$.

The result of the method according to the invention and its advantages in comparison to evaluation of the pilot channel DPCCH will now be explained with reference to FIGS. 3 through 5.

Figure 3:
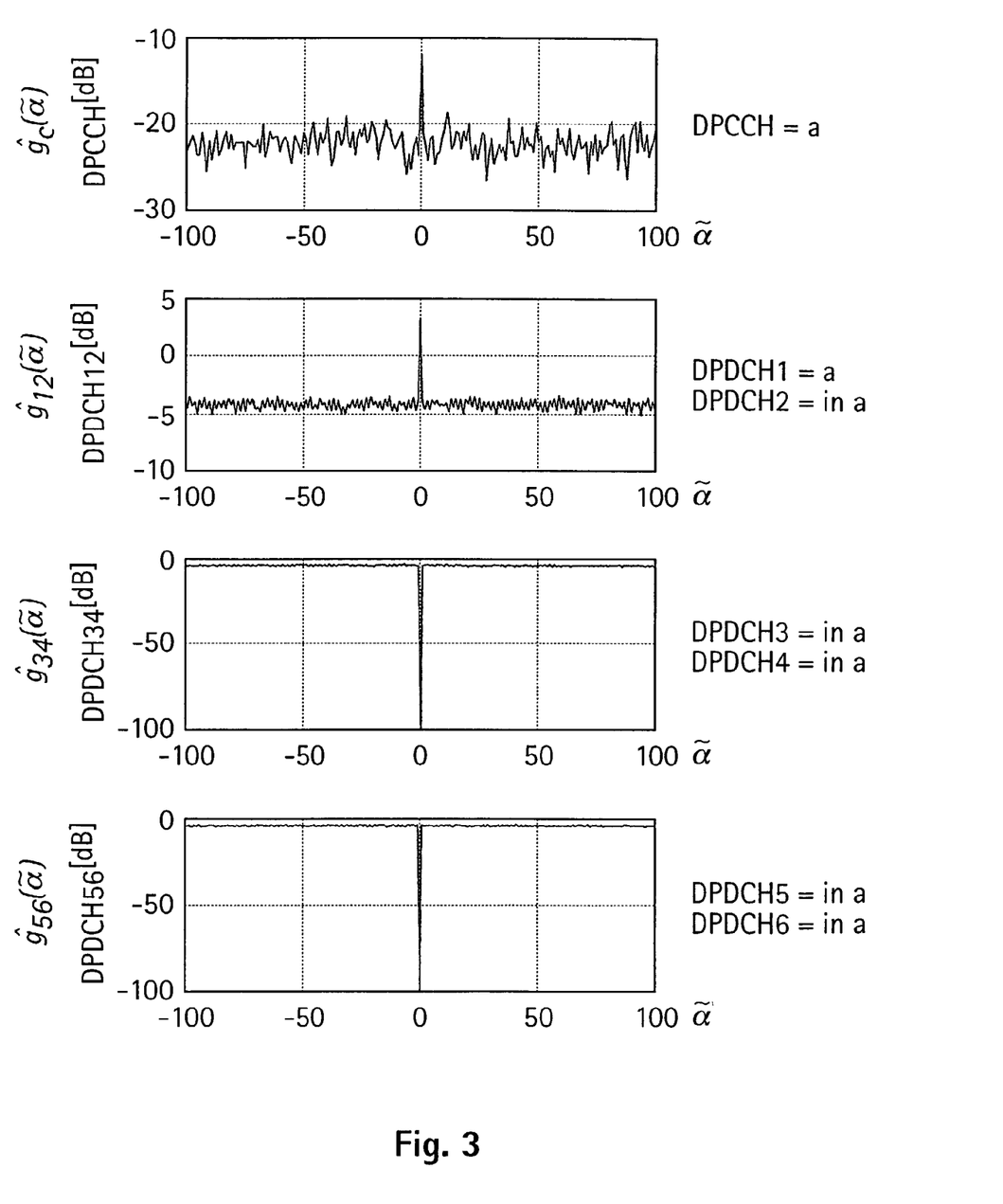
FIG. 3 illustrates the amplification factors in an example in which the first data channel $DPDCH_1$ is active and the other data channels are inactive.

In the example which is illustrated in FIG. 3, the first data channel $DPDCH_i$ is active in addition to the pilot channel DPCCH, while the other channels $DPDCH_2$ through $DPDCH_6$ are inactive. The observation length comprises a half slot=1280 chips. The figure represents the amplification factor $\hat{g}_i(\tilde{\alpha})$ established in accordance with the help of the above explained method depending on the respective time offset estimate based on the value $\tilde{\alpha}$, wherein only the estimate $\tilde{\alpha}$ of 200 chips are taken into account. In the first line is outlined the amplification factor $\hat{g}_C(\tilde{\alpha})$ for the pilot channel DPCCH. In the second line is outlined a combined amplification factor $\hat{g}_{12}(\tilde{\alpha})$ for both data channels $DPDCH_1$ and $DPDCH_2$. One should note here that the spreading codes $sp_1(k)$ and $sp_2(k)$ differ only by a factor j, that is to say the odd numbered data channels modulate the I components and the even numbered data channels modulate the Q components. Since according to the method of this invention, the amounts of the data symbol $r_{v,i}(\tilde{\alpha})$ are evaluated, the phase can be ignored during the determination of the amplification factor, so that the first and the second data channels can not differ from each other. In the third line is outlined the amplification factor $\hat{g}_{34}(\tilde{\alpha})$, wherein also here according to the method of this invention, the same result will be provided for the third data channel $DPDCH_3$ and for the fourth data channel $DPDCH_4$. Accordingly, in the fourth line is illustrated the determined amplification factor $\hat{g}_{56}(\tilde{\alpha})$ wherein the data channels $DPDCH_5$ and $DPDCH_6$ have the same result. The example illustrated in FIGS. 3 through 6 is based on the assumption that no time offset is produced, that is to say that the equation $\alpha=0$ is valid.

With the data channel $DPDCH_1$ that was the only active one in FIG. 3 will be obtained another information-intensive peak (maximum value) of the amplification factor $\hat{g}_C(\tilde{\alpha})$ also for pilot channel DPCCH. The maximum value of the amplification factor $\hat{g}_1(\tilde{\alpha})$ of the data channel $DPDCH_1$ can be, however, better evaluated based on the larger output allocation for the data channel and on the basis of the fact that for the pilot channel DPCCH is used the largest spreading factor, while a smaller spreading factor is used for the data channel $DPDCH_1$ in the example. Clearly distinguishable are the minimum values of the amplification factors $\hat{g}_{34}(\tilde{\alpha})$ and $\hat{g}_{56}(\tilde{\alpha})$ of the non-active data channels $DPDCH_3$ through $DPDCH_6$, which can be very easily evaluated.

Figure 4:
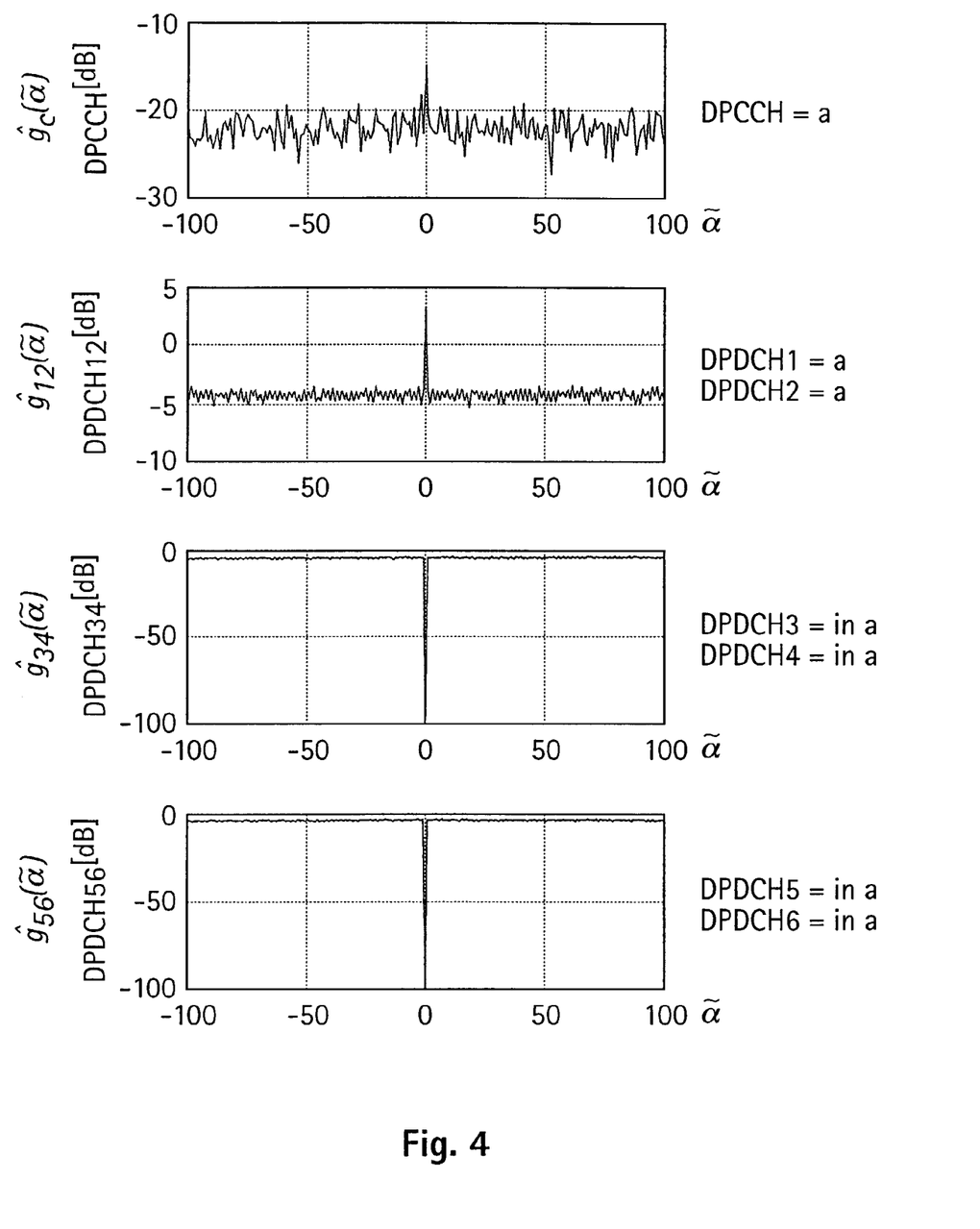
FIG. 4 illustrates the amplification factors in an example in which the first data channel $DPDCH_1$ and the second data channel DPDCH is active and the remaining data channels are inactive.
Figure 5:
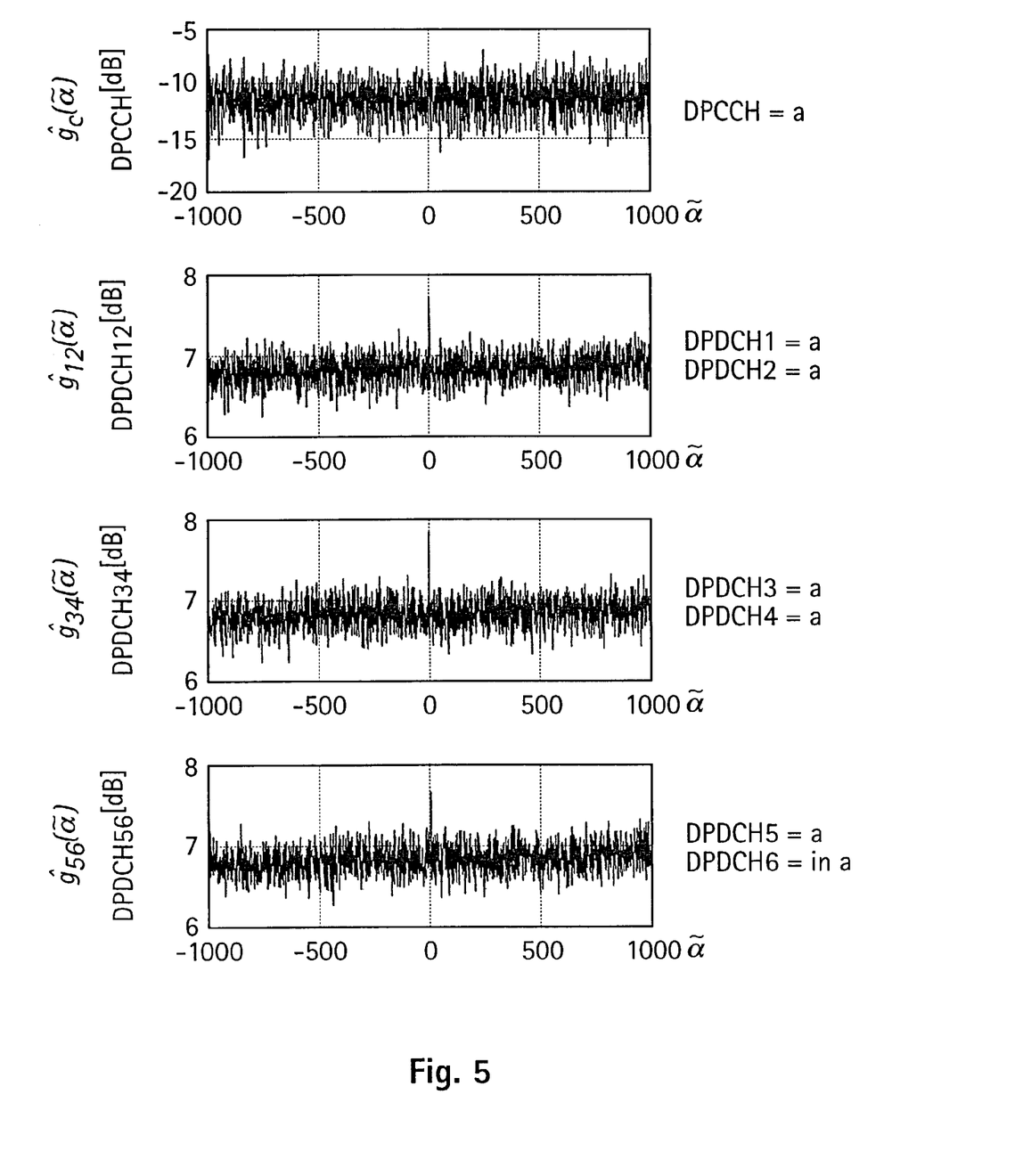
FIG. 5 illustrates the amplification factors in an example in which the first through the fifth data channels $DPDCH_1$ through $DPDCH_5$ are active and the sixth data channel $DPDCH_6$ is inactive.

In FIG. 4 are shown the same parameters as in FIG. 3. The basic example differs here however in that in addition to the first data channel $DPDCH_1$, a second data channel $DPDCH_2$ is also active, while the third through the sixth channel ($DPDCH_3$ through $DPDCH_6$) continue to be inactive. A clear difference in comparison to FIG. 3 is that the peak of the amplification factor $\hat{g}_C(\tilde{\alpha})$ of the pilot channel DPCCH has clearly weaker characteristics due to the relatively smaller output component of this channel when compared to FIG. 3, so that a safe evaluation is now barely possible. In contrast to that, the maximum of the amplification factor $\hat{g}_{12}(\tilde{\alpha})$ continues to have clearly strong characteristics. Also the minimum values of the amplification factors $\hat{g}_{34}(\tilde{\alpha})$ and $\hat{g}_{56}(\tilde{\alpha})$ can be detected without any problem.

The illustration of the parameters in FIG. 5 is again similarly to the illustration in FIG. 4 and FIG. 5 based on an example wherein in addition to the pilot channel DPCCH, data channels $DPDCH_1$, $DPDCH_2$, $DPDCH_3$, $DPDCH_4$ and $DPDCH_5$ are also active, while only the data channel $DPDCH_6$ is inactive. A peak can no longer be recognized in this example for the amplification factor $\hat{g}_C(\tilde{\alpha})$ with $\tilde{\alpha}=0$. On the other hand, the maximum of the amplification factor $\hat{g}_{12}(\tilde{\alpha})$ as well as of the amplification factors $\hat{g}_{34}(\tilde{\alpha})$ and $\hat{g}_{56}(\tilde{\alpha})$ is clearly recognizable and can be easily evaluated.

It is however also possible to use a channel that was never active, for example with SF=8, in addition to the code tree of DPCCH (not shown).

The advantage of the improved evaluation capability of the amplification factors of the Data channels DPDCH in accordance with this invention in comparison to the pilot channel is due to the fact that the pilot channel DPCCH of most mobile radio systems, for instance during an uplink (connection from a mobile station to a base station) is constantly assigned a higher spreading factor SF, for example SF=256. The first data channel $DPDCH_1$ has a spreading factor 4<=SF<=256, wherein SF=4 with the 3GPP downlink of the smallest spreading factor. If a higher data rate is not required, the data channels $DPDCH_2$-$DPDCH_6$ are inactive and the amplification factors $\hat{g}_{34}(\tilde{\alpha})$ and $\hat{g}_{56}(\tilde{\alpha})$ can be evaluated with respect to their minimum values without any problem (the example of the case shown in FIG. 3). If a higher data rate is required, then in case of the 3GPP uplink, first the spreading factor of the data channel $DPDCH_1$ will be reduced in stages until SF=4 is reached for $DPDCH_1$. If a still higher data rate is required, then the other data channels are connected successively with a spreading factor SF=4. In the despreading block 14 can thus be always used spreading codes $sp_i(k)$ with SF=4 either for detection of the maximum of an active data channel, or for detection of the minimum of an inactive data channel. The above described circumstance facilitates the evaluation considerably, because during the evaluation of the pilot channel DPCCH customary up until now, in the despreading block 14 had to be used a spreading factor of SF=256, which would require a significantly higher calculation expense and a higher observation time than the evaluation of the data channel DPDCH according to the invention with a spreading factor of SF=4.

A block diagram showing a second embodiment of the method of this invention will now be explained with reference to FIG. 6. The elements that were already described in FIG. 2 are provided with the same reference symbols so as to render repeated description unnecessary.

Figure 6:
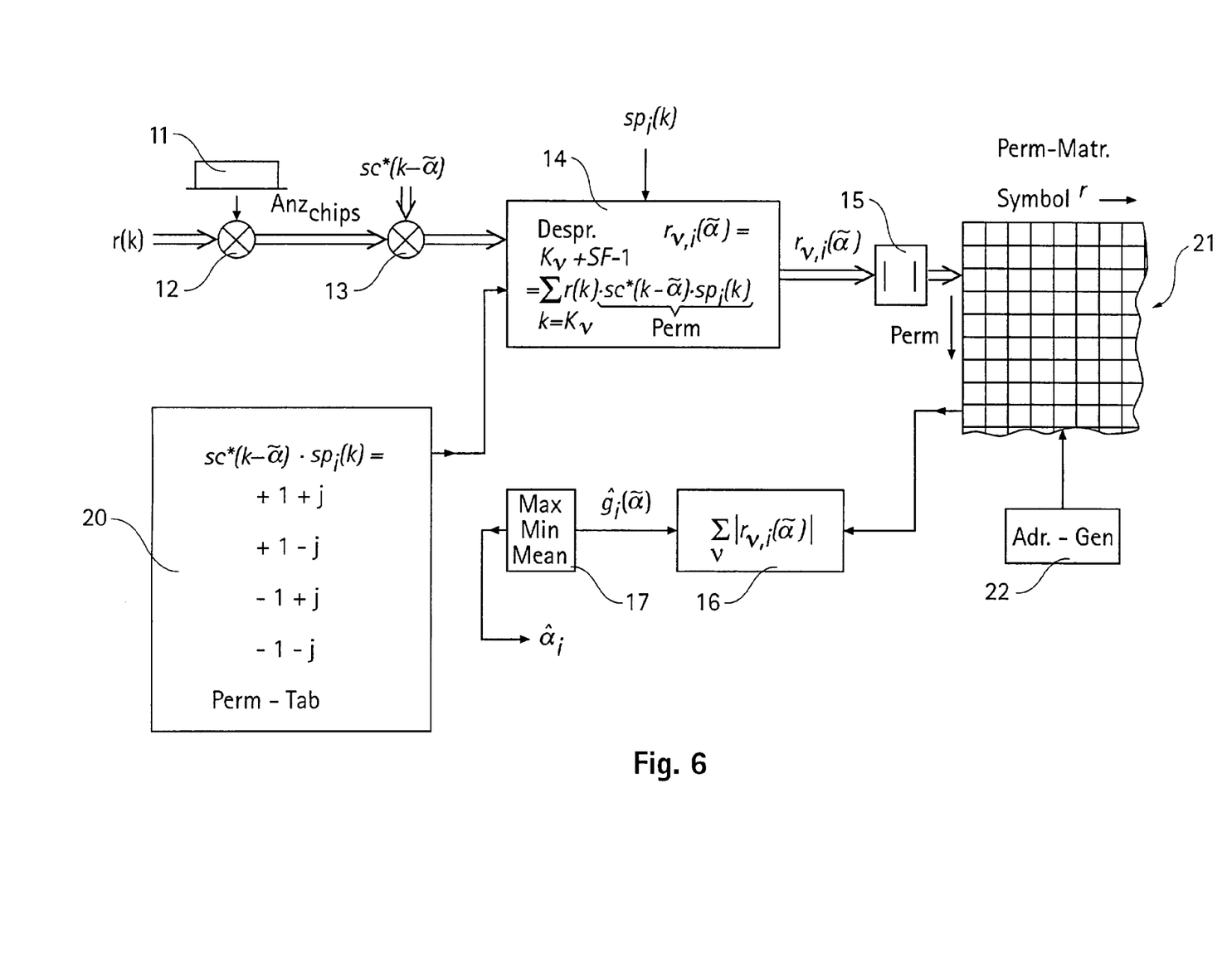
FIG. 6 is a block diagram of a second embodiment of the method according to the invention.

The further development of the invention shown in FIG. 6 is based on the realization that formula for despreading $$r_{v,i}(\tilde{\alpha}) = \sum_{K=K_v}^{K_v+SF-1} r(k) \cdot sc*(k-\tilde{\alpha}) \cdot sp_i(k) \quad (1)$$

with the factor $$sc*(k-\tilde{\alpha}) \cdot sp_i(k)$$

only $4^{SF}$ permutations can be assumed, wherein SF is the spreading factor of the spreading code $sp_i(k)$. Since the received chip sequence $r(k)$ is identical for each amplification factor $\hat{g}_i(\tilde{\alpha})$ to be calculated, that is to say for each value $\tilde{\alpha}$, this means that a plurality of multiplications must be calculated several times in the summands of the formula above. In order to reduce the calculating time, it is therefore advantageous to calculate all the permutation of the term $$sc*(k-\tilde{\alpha}) \cdot sp_i(k)$$

and to calculate all the $4^{SF-1}$ permutations for a received chip sequence $r(k)$ for symbol $r_{v,i}(\tilde{\alpha})$ to be calculated for each symbol in advance only once and to deposit these permutations for each symbol in a permutation matrix. In order to illustrate clearly this principle, FIG. 6 indicates a permutation table 20 which contains four complex value permutations of the term $$sc*(k-\tilde{\alpha}) \cdot sp_i(k)$$

In this case the factor $sc*(k-\tilde{\alpha})$ assumes only the values +-1+-j, while for the factor $sp_i(k)$ can be assumed only the values +-1. The amounts of the symbols $r_{v,i}(\tilde{\alpha})$ calculated for all the permutations are stored in intermediate storage for all symbols and for all permutations in a permutation matrix 21. With summation via the SF summands, there will thus be $4^{SF}$ permutations for each symbols $r_{v,i}(\tilde{\alpha})$. During the calculation of the amplification factor $\hat{g}_i(\alpha)$, the present $\tilde{\alpha}$ will be accessed for a concrete present permutation for each symbol $r_{v,i}(\tilde{\alpha})$ by of an address generator 22.

The calculation time can be clearly reduced with the permutation matrix 21. For a spreading factor SF=4 will thus be produced $4^{SF-1}$=64 permutations for each symbol. With a scrambling range consisting of 38400 chips and an observation length of 2560 chips, the calculation expense will be reduced when compared to a linear implementation approximately by a factor of 150.

Accordingly, a quick determination of the time offset of received CDMA signal is enabled.

Embodiments of the present invention can be implemented on computer-readable media bearing instructions that are arranged, when executed, to cause one or more computer or digital signal processors in a digital processing system. to determine the time offset of a CDMA signal. The term "computer-readable medium" as used herein refers to any medium that participates in providing instructions to a computer or digital signal processor for execution. Such a medium any take many forms, including but not limited to non-volatile media, volatile media, and transmission media. Non-volatile media include, for example, optical or magnetic disks. Volatile media include dynamic memory. Transmission media include coaxial cables, copper wire and fiber optics, including the wires that comprise a computer bus. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

While the present invention has been described in connection with a number of embodiments and implementations, the present invention is not so limited but covers various obvious modifications and equivalent arrangements, which fall within the purview of the appended claims.

What is claimed is:

1. A method for determining a time offset of a CDMA signal including data signal symbols borne on a plurality of data channels and pilot signal symbols borne on a pilot channel, each of said data channels being spread with a corresponding spreading code to a chip sequence and subjected to amplification factors, wherein the combined CDMA signal from the data channels and the pilot channel is multiplied by a scrambling code, and wherein the CDMA signal has undergone during transfer the time offset to be determined by a number of chips, said method comprising:
   for each of a plurality of time offset estimates, performing the steps of:
      multiplying a received chip sequence with a conjugate complex scrambling code that is shifted by a number of chips according to one of the time offset estimates,
      despreading the chip sequence based on the spreading code of at least one selected data channel to produce a symbol sequence, and
      determining an estimated amplification factor by summation of an amount of the symbol sequence; and
   determining a maximum of the amplification factors for the time offset estimates when a selected data channel is active, or determining a minimum of the amplification factors for the time offset estimates when the selected data channel is not active.

2. The method according to claim 1, wherein:
   the maximum and the minimum of the amplification factors is determined for the time offset estimates of the estimated factors when it is not known whether the selected data channel is active or not.

3. The method according to claim 1, further comprising evaluating the received chip series in a time window, in which a number of chips is contained that corresponds to an integral multiple of the length of the spreading code.

4. The method according to claim 1, wherein:
   the plurality of time offset estimates includes each possible time offset within the scrambling code.

5. The method according to claim 1, further comprising:
   storing permutations of the product of the conjugate complex scrambling code with the spreading code of the selected data channel that can occur during despreading for each symbol in a permutation matrix.

6. The method according to claim 5, wherein:
the permutation matrix is calculated at a beginning of a procedure for the received chip sequence and that the permutation matrix is accessed during the calculation of the estimated amplification factors.

7. The method according to claim 1, further comprising:
selecting the data channels that are either all active or all inactive, wherein the maximum or the minimum is determined from the linear combination of the amplification factors.

8. A computer-readable medium bearing instructions for determining the time offset of the CDMA signal, said instructions being arranged, upon execution thereof, to cause one or more processors to perform the steps of the method according to claim 1.

9. A digital signal processing system including a digital signal processor and a memory and configured to perform the steps of the method according to claim 1.

10. A method for determining a time offset incurred by a CDMA signal during transfer, said method comprising:
receiving the CDMA signal, said CDMA signal borne on a plurality of data channels and a pilot channel;
estimating a plurality of amplification factors for a plurality of corresponding time offset estimates; and
determining the time offset based on a maximum of the amplification factors for the time offset estimates when a selected data channel is active or based on a minimum of the amplification factors for the time offset estimates when the selected data channel is not active.

11. The method according to claim 10, wherein:
each of said data channels is spread with a corresponding spreading code to a chip sequence and subjected to amplification factors;
a combined CDMA signal from the data channels and the pilot channel is multiplied by a scrambling code; and
the step of estimating includes:
multiplying the chip sequence with a conjugate complex scrambling code that is shifted by a number of chips according a time offset estimate;
despreading the chip sequence based on the spreading code of at least one of the data channels to produce a symbol sequence; and
summing an amount of the symbol sequence to determine an estimated amplification factor.

12. A computer-readable medium storing executable instructions for determining the time offset of the CDMA signal, said instructions being arranged, upon execution thereof, to cause one or more processors to perform the steps of the method according to claim 10.

13. A digital signal processing system including a digital signal processor and a memory and configured to perform the steps of the method according to claim 10.

* * * * *